United States Patent [19]

Jauregui Carro

[11] Patent Number: 4,992,017
[45] Date of Patent: Feb. 12, 1991

[54] BULK SHIPPER FOR HARBOURS AND THE LIKE

[76] Inventor: Francisco J. Jauregui Carro, Castilla, 14, 39002 Santander, Spain

[21] Appl. No.: 355,000

[22] Filed: May 22, 1989

[30] Foreign Application Priority Data

| May 27, 1988 | [ES] | Spain | 8801692 |
| Nov. 17, 1988 | [ES] | Spain | 8803508 |
| Nov. 17, 1988 | [ES] | Spain | 8803509 |

[51] Int. Cl.$^5$ .................................................. B65G 63/00
[52] U.S. Cl. .............................. 414/140.5; 414/140.7; 414/503; 414/504; 414/523; 414/526
[58] Field of Search ............ 414/139.4, 139.9, 140.5, 414/140.7, 140.9, 141.8, 141.4, 502–505, 523, 526, 919

[56] References Cited

U.S. PATENT DOCUMENTS

| 1,852,385 | 4/1932 | Weigert | 414/141.8 X |
| 3,179,272 | 4/1965 | Goldberger | 414/504 |
| 3,486,641 | 12/1969 | Zweifel et al. | 414/141.4 X |
| 3,493,136 | 2/1970 | Spellman, Jr. | 414/505 X |
| 3,519,146 | 7/1970 | Moeller | 414/141.4 |
| 3,633,879 | 1/1972 | Prichard | 414/505 X |
| 3,642,155 | 2/1972 | Carlson | 414/504 X |
| 3,684,255 | 8/1972 | Rossi | 414/523 X |
| 4,020,953 | 5/1977 | Eklöf et al. | 414/141.4 |
| 4,085,975 | 4/1978 | Bilkvist | 414/139.4 X |
| 4,561,821 | 12/1985 | Dillman | 414/919 X |
| 4,583,905 | 4/1986 | Scherr | 414/523 X |
| 4,613,275 | 9/1986 | Karlowsky | 414/505 X |

FOREIGN PATENT DOCUMENTS

| 3711491 | 10/1988 | Fed. Rep. of Germany | 414/140.5 |
| 0161630 | 9/1983 | Japan | 414/505 |
| 0264130 | 11/1987 | Japan | 414/140.7 |
| 8400948 | 3/1984 | World Int. Prop. O. | 414/140.7 |

Primary Examiner—Frank E. Werner
Assistant Examiner—William M. Hienz
Attorney, Agent, or Firm—Abelman, Frayne, Rezac & Schwab

[57] ABSTRACT

This shipper is constituted by a movable platform (1) which is provided with a loading hopper (3) having a suitable capacity, from which platform (1) projects a support (7) for a bulk elevating system (9) which may be coupled to one of the ends of the hopper (3) and which in turn extends into another discharge tube (14), such that these tubes, when in an inactive position, are horizontally folded on each other, while when in a working position they form an angle capable of overcoming obstacles of considerable height and width and the discharge tube (14) ending in a discharge nozzle (17) which may be pointed in any direction. A cabin (21) is also established on this platform (1) housing the control device of the assembly and the roof of which is provided with a support (22) for the bulk elevating system (9) and the discharge tube (14), when the latter are inactive or when the assembly is being transported.

1 Claim, 4 Drawing Sheets

BULK SHIPPER FOR HARBOURS AND THE LIKE

OBJECT OF THE INVENTION

The present invention relates to a shipper specially designed to carry grain or other like products, specifically from the harbour dock to the ship hold, but which can also be used in any other practical application where similar characteristics are required.

BACKGROUND OF THE INVENTION

In practical application such as the one mentioned above, i.e., for bulk carrying from the storage area to ship holds, bulk is currently carried by different means from the said storage area to an area of the dock right next to the relevant ship, and from this point, with the aid of mechanical shovels, crab cranes, etc., the bulk is definitively moved to the ship holds, which solution is valid for want of a more practical one, although it is obviously slow and painstaking, and therefore negatively affects the economical aspect.

DESCRIPTION OF THE INVENTION

The bulk shipper set forth by the invention fully solves these problems, allowing easy transfer of the bulk from an area of the dock close by the ship to the ship holds.

More specifically and in order to achieve the above, the shipper being described is constituted by a movable platform which may or may not be self-propelled, of little height, in order to facilitate lorry dumping thereon, and which can be aided with legs which may be assembled at the edges of the said platform, to be used during the working stage thereof, at the same time as its reduced height allows the bulk carrying vehicles to be unloaded easily and directly thereon, whether by means of a tip cart or not, which platform is provided with a large capacity loading hopper, the bottom whereof is constituted by an endless screw, a conveyer belt or other means capable of carrying the product deposited on the said hopper towards one of the ends thereof, where an outlet nozzle is positioned.

At one of the ends of the said platform, beyond the hopper end provided with the said outlet nozzle, is established a vertical support for a bulk elevating mechanism or like element, of considerable length, jointedly, linked to the end of the said support, such that, on tilting, which can take place either mechanically, hydraulically or pneumatically, one end of the said system, which is provided with a side inlet mouth and through the said mouth, couples to the outlet hopper nozzle, the bulk elevating system thus being able to drag the product in a rising and sloped direction, specifically with a suitable slope for passing the shipdeck and resting the free end thereof on the deck, which free end comprises a discharge opening to which is jointedly coupled a further multi-directional discharge tube, joined to the bulk elevating system through a joint which may also be activated by mechanical, hydraulic or pneumatic means, such discharge tube, which is long enough to reach the ship hold, and ends in an outlet nozzle, may be pointed by means of a cardan-type or like coupling and with which the granular product, on leaving the tube, may be more accurately pointed towards any area of the ship hold.

As a complement to the structure described, on the same movable platform and on the area opposite the support for the bulk elevating system, and the discharge tube, there is established a control cabin, which is likewise useful for storing tools or auxiliary elements of the system, the roof of such cabin further including a support base both for the bulk elevating system and the discharge tube, when the latter is inactive during the transport of the device when such discharge means are at rest.

In an alternative embodiment, the bulk elevator has a first section which when in a working position is vertically arranged, in order to avoid contact with any obstacle which might arise when the said elevator takes up a sloped position. On the upper edge of the said elevator is joined a conveyor belt which, when active, is horizontally arranged, whereas the end of the said belt is provided with the corresponding discharge tube which, when in a working position, runs vertically downwards with its lower end comprising a bend capable of pointing the grain outlet towards any area of the ship hold, for the said end bend is joined with a freedom of rotation between 0° and 360°.

This varying embodiment, i.e., where the first section of the elevator is vertically positioned when in a working position and the discharge tube is likewise vertically positioned, the two sections being joined to each other by the intermediate and horizontal conveyor belt, is complemented with braces which stiffen the assembly when in an operative position, a brace being provided between the upper end of the vertical extraction section of the elevator and the actual control cabin, whereas a futher brace is joined to the conveyor belt, the other end of which is fixed to a support which projects upwards from the said vertical extraction section.

The object of the invention in this embodiment is that the horizontal conveyor belt be capable of describing an arc within the horizontal plane, in order that the discharge tube may more to different points of the ship hold.

Finally, regarding the embodiment being described, it should be pointed out that the snipper has been designed to be permanently kept on the dock, although it could have wheels to travel along rails, thereby affording greater manoeuvrability, in which latter case its displacement would be restricted by the rails to a specific, fixed area on the harbour dock, and therefore it would not be essential for the elements constituting the elevating system to be pliable, since if the assembly or general structure were designed to remain static, the said bulk elevating and carrier elements could obviously well be made stiff and static.

In either of the aforesaid two embodiment, the general movable platform would preferably and advantageously be constituted by a self-supporting chassis made of high resistance profiles, which transmits and supports all live loads applied, transmitting the same to the respective support means when in operation, or to the wheels when the platform as a whole moves along the said wheels.

Furthermore, the driving means for the product or bulk from one end of the storage hopper to the other, is comprised, in a preferred embodiment, by a conveyor belt assembled on block sheaves, designed to bear the weight of the unloaded material and to carry the same towards the elevating system outside the hopper, with the particularity that the mentioned conveyor belt assembly block sheaves are provided with rubber to withstand the impact when the material falls on the said belt without damaging the same.

A preferred embodiment is also comprised by the fact that the elevator should be constituted, regarding its upward or extraction section, by the supporting structure which serves as locking means for the endless screw being integral with the corresponding surrounding sleeve, in order that when the material is raised there is no friction with the walls nor breakage thereof, performance thereby being increased, the lower end of which endless screw projects as a short bent stretch to receive that product from the storage hopper, such stretch of the endless screw being housed in an outer casing fixed to the supporting structure.

The upper end of the mentioned endless screw is complemented by a hood which protects another projecting stretch of the endless screw, in order to allow discharge or unloading of the extracted product towards the discharge tube, the latter being complemented by air jets for the material to flow in the event of caking or of an insufficient angle.

The folding and collapsible means are based on hydraulic devices which very smoothly go about the operation to change an angle or complete folding, the said angle change referring to that formed between the elevating endless screw and the discharge tube.

DESCRIPTION OF THE DRAWINGS

In order to complement the description being made, and to assist a better understanding of the characteristics of the invention, a set of drawings is attached to the present specification, as an integral part thereof, where the following has been shown in an illustrative and nonlimiting manner.

PREFERRED EMBODIMENT OF THE INVENTION

Figure 1:
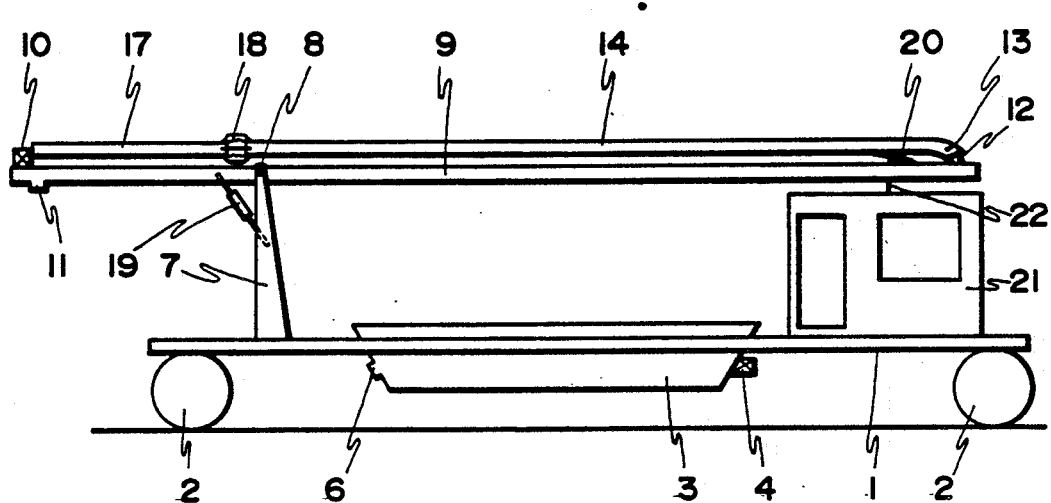
FIG. 1—Shows a diagrammatic side elevation view of a bulk shipper for harbours and the like made in accordance with the object of the present invention, with the shipper in a carrying position.
Figure 2:
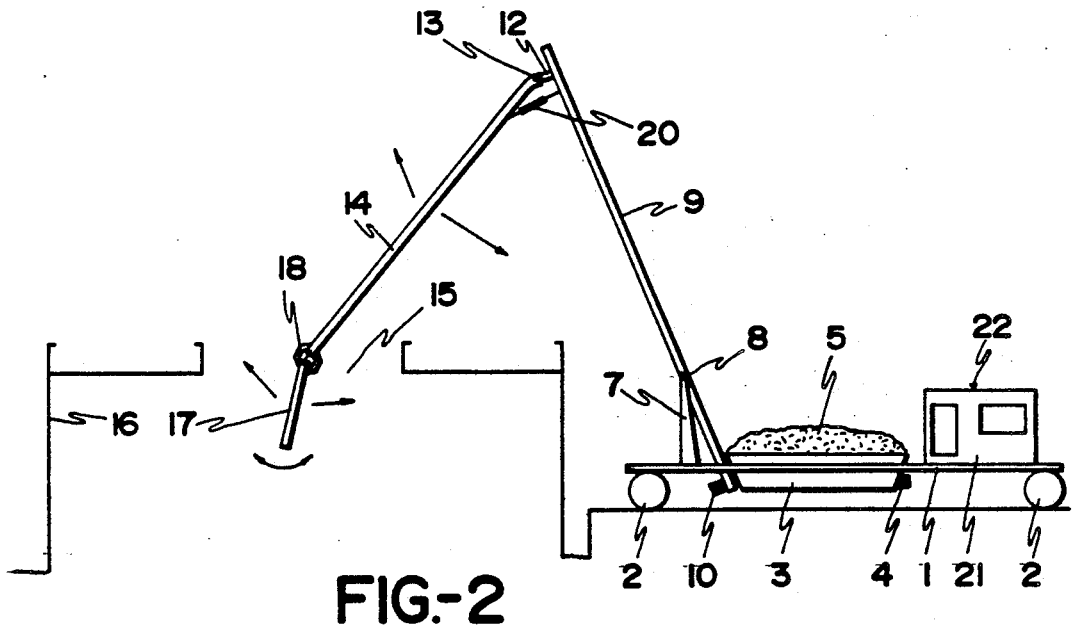
FIG. 2—Shows a similar view to that of FIG. 1, where the shipper is in a product loading position onto an extremely diagrammatic boat.

In the light of FIGS. 1 and 2, it may be observed that the shipper being described is constituted by a movable platform (1), the wheels (2) whereof may be fixed or self-orientable and self-propelling up to 90° in order that the shipper may move transversally to expedite filling the whole length of the holds without having to move the ship, which platform may in turn be self-propelled or designed to be driven by any driving vehicle, which platform is, at all events, provided with a loading hopper (3) at a short distance from the ground in order to expedite dumping of bulk when the lorries tip thereon, such hopper (3) having suitable dimensions and the bottom whereof is provided with an endless screw, a conveyor belt or other system, driven by the corresponding motor (4), and capable of moving the product (5) housed therein towards one of its ends whereat is established an outlet nozzle (6) which is kept closed by any suitable means.

On the platform (1) and at the end corresponding to the outlet nozzle (6), there is provided a vertical support (7) on which is tiltingly mounted, specifically by means of the shaft (8), a bulk elevating system (9), which consists of a tube which houses an endless screw driven by a motor (10). The tube is provided at one of its ends with an inlet mouth (11). When the tube moves from the horizontal inactive position shown in FIG. 1 to the discharge position shown in FIG. 2, the inlet mouth (11) couples to the outlet nozzle (6) of the hopper (3), and thus a direct and automatic interconnection between the two elements takes place. The bulk elevating system (9) collects the granular product (5) from the hopper and raises it towards its outer end, where there is provided a side discharge mouth (12). A joint (13) connects a discharge tube (14) to the elevating system (19) as shown in FIG. 2.

The free end of the discharge tube (14) is joined to a discharge nozzle (17), which may be pointed in any direction, through a cardan or like coupling (18) positioned between the said nozzle and the discharge tube (14).

Tilting actuation of both the endless screw (9) and the discharge tube (14) takes place by means of actuating systems (19) and (20), which may be hydraulic, pneumatic or electrical, controlled from a cabin (21) established at the end of the movable platform (1) opposite the support (7), but any other actuating means may obviously be used for such movable elements, which cabin (21) will also have the self-driving means therefor, if they are provided, together with such tools and other auxiliary elements as may be suitable or necessary.

Furthermore, and as shown in FIG. 1, a support (22) is provided on the roof of the cabin (21) for the bulk elevating system (9) and the discharge tube (14) to rest on, when such elements are inactive, corresponding to when the assembly is transported.

In accordance with the above structure, the shipper moves, when empty, by its own or any other means towards the area of the dock next to the ship (16), is duly fixed with the aid of its telescopic legs, and receives the bulk from the storeroom, with the aid of lorries or by any other means, same being discharged onto the hopper (3), the bulk elevating system (9) and the discharge tube (14) being duly tilted until same are situated in correspondence with the inlet (15) to the ship hold, at which moment discharge commences by starting the motor (10) which drives the bulk elevating system (9) and takes product from the hopper (3) through the outlet mouth (6) of this latter, towards which the product is being displaced within the hopper, due to the action of the endless screw, conveyor belt or the like estabished at the bottom thereof and driven by the motor (4).

A high performance bulk loading and transport system is thus obtained, which may be easily transported and has an optimum manouevrability, which allows the easy elevation of the granular product and discharge thereof at a considerable distance, with a perfect control over the discharge area, for which reason the system is especially suited to be used in ships moored to docks, although obviously, and as already stated, it may be applied to any other practical application, where the same or similar performance is required.

Figure 3:
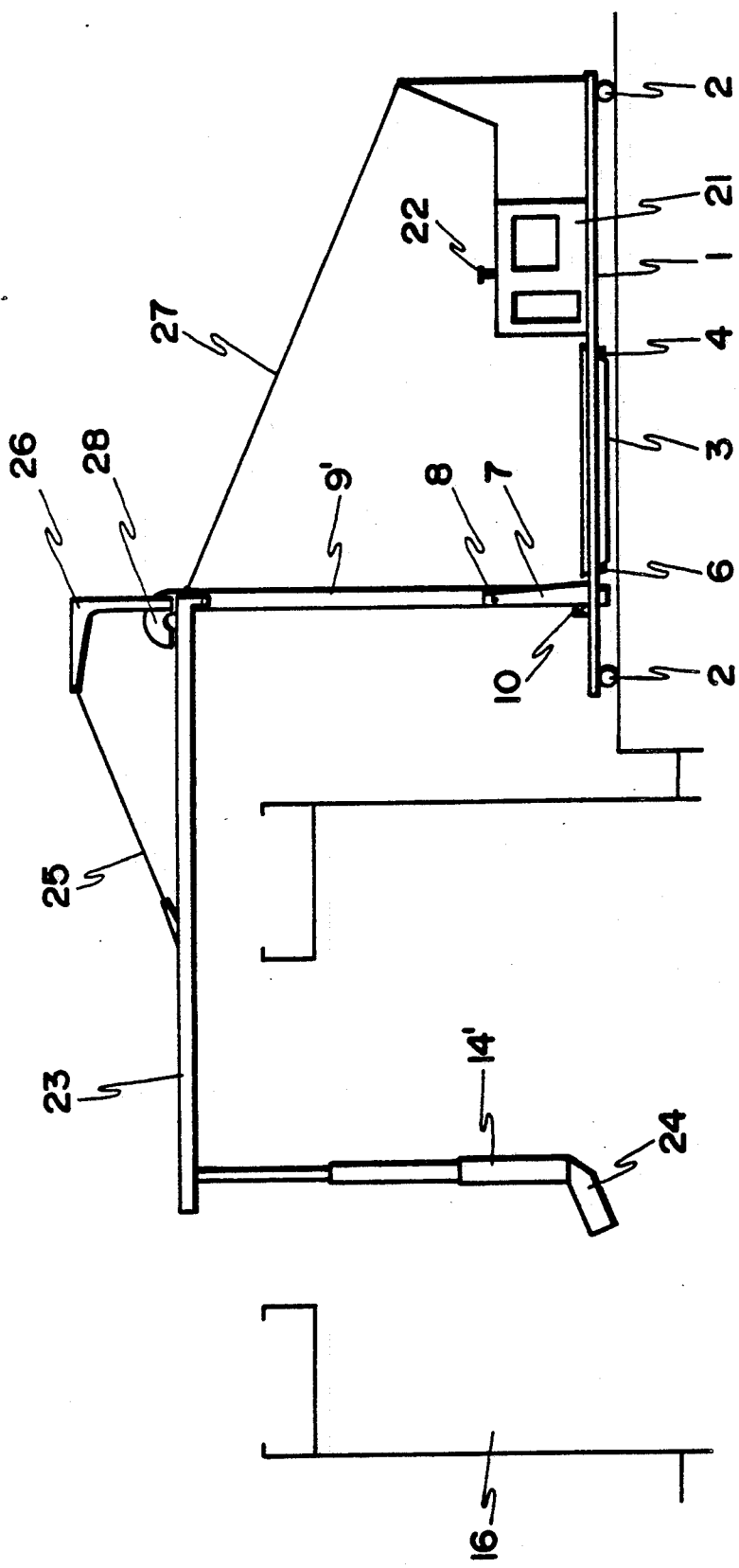
FIG. 3—Shows a diagrammatic side elevation view of the bulk shipper in the embodiment where the product elevator has both its extraction section and its discharge section in a vertical position, with the horizontal conveyor belt positioned between the two.
Figure 4:
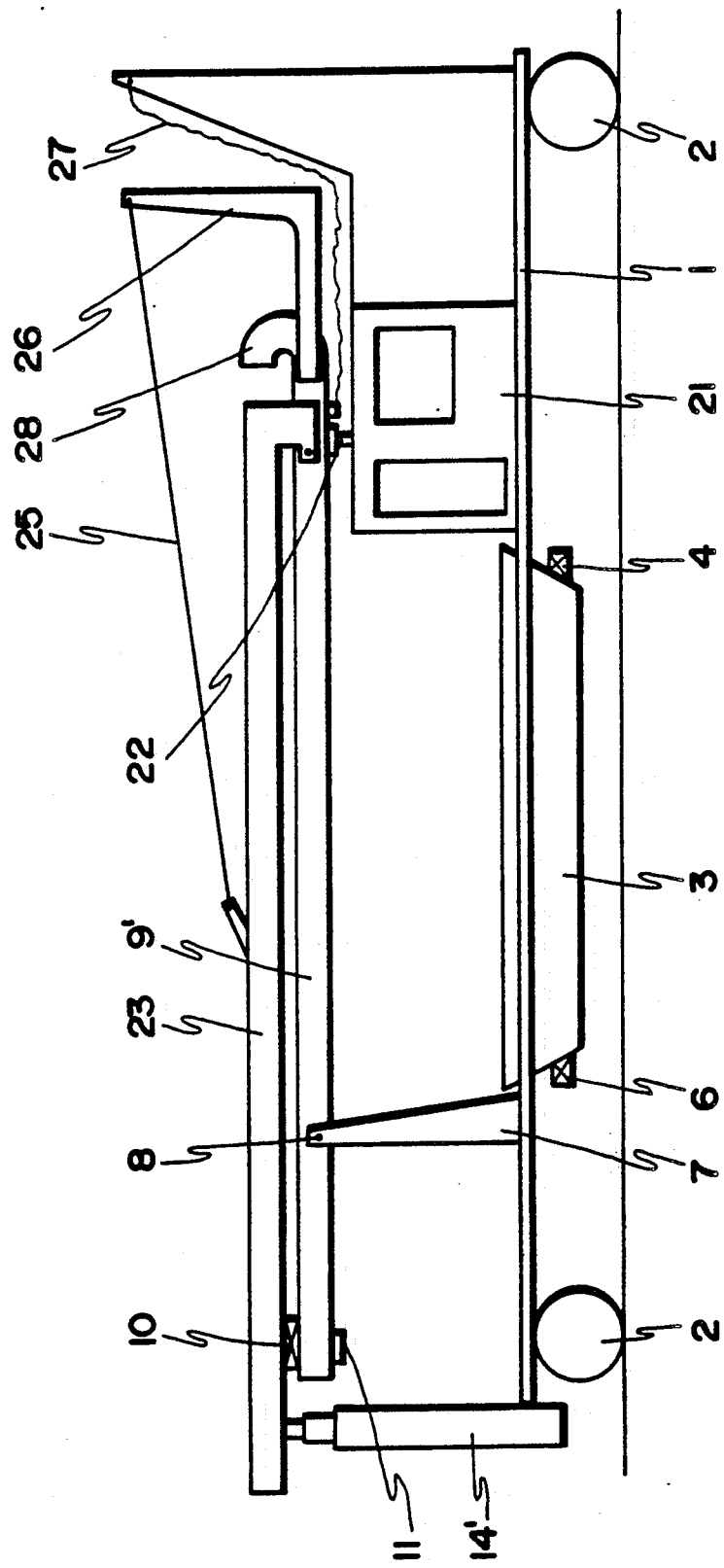
FIG. 4—Shows the same shipper as the preceding figure, in a folded or inactive position.

FIGS. 3 and 4 show a varying embodiment, where the general structure of the shipper remains with the same elements, but with the particularity in this case that the elevating system, now numbered (9'), is jointed at (8) with respect to the support (7) such that when in a working position this section or bulk elevating system (9') is vertically arranged, as shown in FIG. 3, whereas the discharge tube, numbered (14') in FIGS. 3 and 4, is likewise vertically arranged when in a working position, and both sections or elements (9') and (14') are not joined to each other, but a conveyor belt (23) is horizontally positioned between the two, when in a working position, and drives the product from the upper end of the elevator (9') to the discharge tube (14'), this latter being collapsible and being further provided at its end with a bent projection (24), which may be pointed in any direction to allow discharge of the bulk on any area of the hold (16), at the same time as the joint between the conveyor belt (23) and the elevator (9') is such that it likewise allows the conveyor belt (23) to be pointed in a horizontal plane, thereby allowing the discharge tube (14') to be displaced to either side, depending on the rotation in the horizontal plane of the conveyor belt (23), to allow unloading on every area of the hold (16).

The said conveyor belt (23) may be driven by any conventional system.

In the operative position shown in FIG. 3, the conveyor belt (23) drives a cable constituting a brace (25) which is attached on its other end to a support (26) being integral with the upper end of the elevator (9'), to which is in turn related a further brace (27), the opposite end whereof is fixed to the cabin itself (21).

Based on the brace (25), from the rest position shown in FIG. 4, the conveyor belt (23) may be raised and placed perpendicularly to the elevator (9') to locate the assembly in a working position, whereas brace (27) supports the mentioned elevating system in its working position.

Unloading of the elevator (9') onto the actual conveyor belt (23) takes place by means of a bend (28) provided at the upper end of the said elevator (9').

The operative construction of the shipper with the modifications of FIGS. 3 and 4 is exactly as described for the shipper shown in FIGS. 1 and 2.

Figure 5:
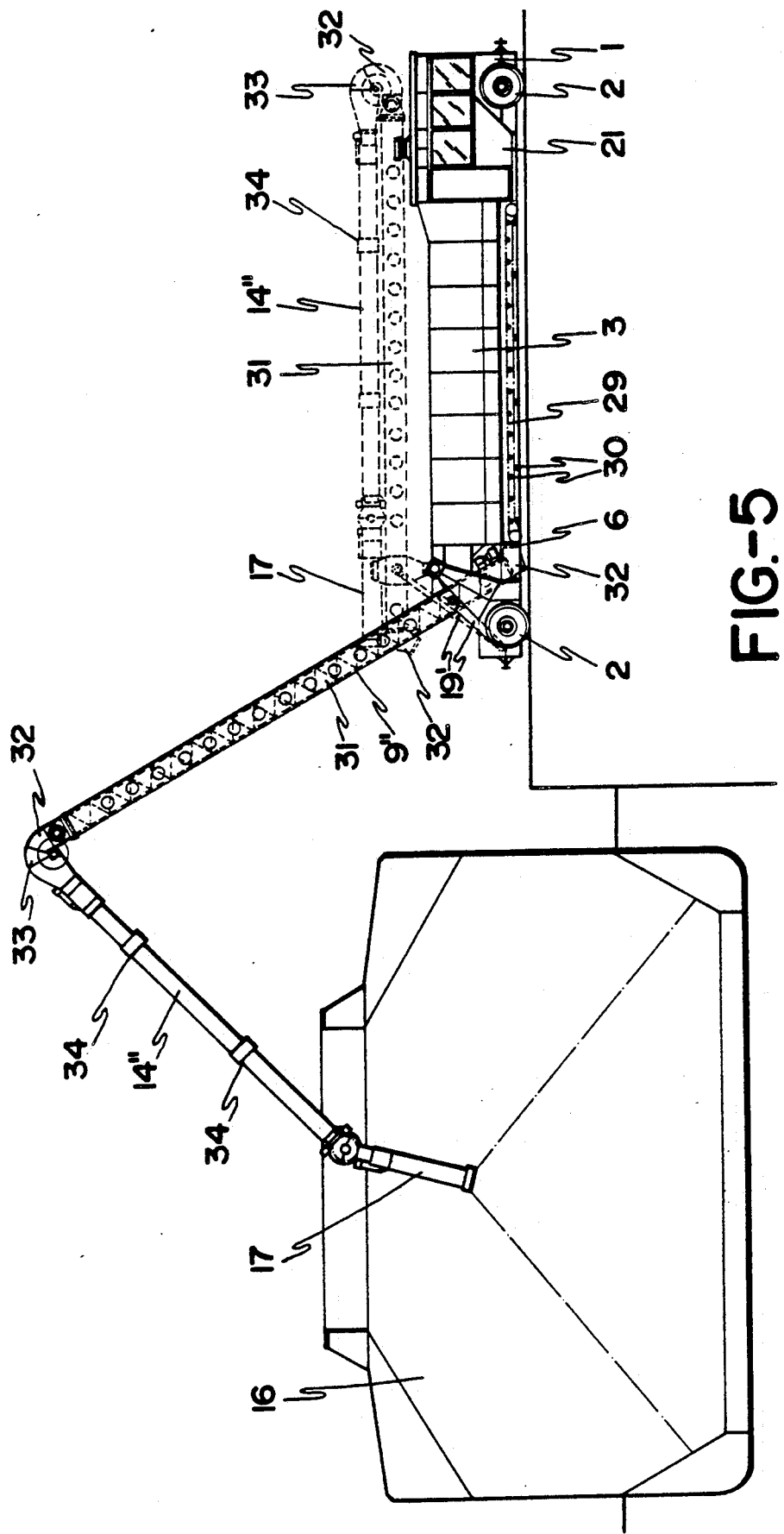
FIG. 5—Finally shows a general elevation view of the shipper shown in FIG. 1, in which some modifications have been introduced, namely the specific shape of the product elevation and driving means from the storage hopper towards the ship hold, and even, in this case, the actual shape of the cabin loading hopper and the joining means of the different elements.

Finally, FIG. 5 shows the shipper of FIG. 1, but with several of its elements comprised in a specific manner.

Thus, platform (1) is comprised by a general frame made of high resistance profiles, to form a self-supporting chassis which transmits and supports all live loads applied, transmitting same to the corresponding wheels (2) which form the transport system of the assembly as aforesaid, and which is preferably formed by four pneumatic wheels of the type normally used in lorries, same being further orientable and optionally being capable of turning 90° for transversal displacement of the assembly to allow the placing of the shipper in the most suitable position, the said wheel's being hydraulically driven.

This supporting chassis may be complemented with a system of collapsible legs as described in connection with FIGS. 1 and 2 for resting in the working position, and which any be constituted by a telescopic beam which collapses onto the chassis, and a support with a distribution plate at its end, driven by a hydrauic cylinder.

As regards the cabin (21), same includes, as aforesaid, the corresponding control devices and a diesel motor with hydraulic pumps and relevant safety elements, and may likewise further be provided with petrol tanks, batteries, and even a system of compressed air for jets which will be described hereinafter.

The product carrying element from one end of the hopper (3) to the other is constituted, as shown in FIG. 5, by a conveyor belt (29) which drives the product to the corresponding outlet mouth (6), which conveyor belt (29) is assembled on a plurality of block sheaves (30), located close to each other, the whole assembly being designed to bear the weight of the material unloaded onto the conveyor belt (29), it further having been foreseen that the block sheaves (30) are coated in rubber in order to withstand the impact on falling of the material without the belt being damaged.

The end of the elevator, here numbered (9''), is coupled to the outlet mouth (6) of the repeatedly mentioned hopper (3), and is basically comprised by an endless screw (31) forming an integral part of the relevant surrounding sleeve, which corresponds to (9''), and which is further jointedly assembled such that it may move from a horizontal position, as shown by the dotted line of FIG. 5, to and upwardly sloped working position, it being driven by the corresponding hydraulic cylinder (19'), i.e., all as described and shown in FIGS. 1 and 2.

The lower end of the said endless screw (31) extends into a bent section (32) which is coupled to the corresponding outlet mouth (6) of the hopper (3), in order that it may thus receive the product from the hopper (3) which is dragged by the actual conveyor belt (29) to the bend (32) such that, once inside, it is dragged by the endless screw (31) to the upper section, where the discharge tube (14'') is jointed, the joint and coupling area between the elevator (9'') and the discharge tube (14'') being protected by a surrounding hood formed by two half-sections (33-33). The discharge tube (14'') includes, at strategic positions, two jets (34) for making the product flow, in the event of caking or of an insufficient angle.

It should finally be pointed out that the said discharge tube (14'') extends, with the relevant joint, into the already mentioned discharge nozzle (17).

I claim:

1. A conveyor mechanism for use in loading grain or other particulate material into the hold of a ship, comprising:

a frame having a longitudinal direction and a transverse direction;

wheels supporting said frame for movement in at least one of said longitudinal and transverse directions;

a hopper supported on said frame, said hopper having a low profile permitting top loading thereof from a dump truck, and having a conveyor belt extending in the longitudinal direction of said frame and providing a bottom surface of said hopper, said hopper extending downwardly beneath said frame into proximity with a ground surface on which said mechanism is supported, and having a discharge opening extending rearwardly of said hopper and located at a position beneath said frame;

a screw-type conveyor pivotally supported on said frame for arcuate movement in the longitudinal direction of said frame about an axis extending transversely of said frame, said screw-type conveyor having an inlet at a lower end thereof positioned for cooperation with said hopper discharge opening in one extreme position of arcuate movement of said screw-type conveyor, said inlet being removed from cooperation with said hopper discharge opening and said screw-type conveyor extending longitudinally along said frame when said screw-type conveyor is in an opposite extreme non-use position of arcuate movement;

a discharge tube pivotally connected at one end to an upper end of said screw-type conveyor and adapted to extend over the side of a ship;

a discharge nozzle pivotally connected to an opposite end of said discharge tube and adapted to discharge conveyed material into a hold of said ship;

means for moving said screw type-conveyor from said opposite position to said one position;

means for adjusting the angular orientation of said discharge tube relative to said screw-type conveyor;

means for adjusting the angular orientation of said discharge nozzle relative to said discharge tube; and, means for driving said respective conveyors;

said screw-type conveyor extending rearwardly of said frame when in said one position for a discharge opening of said screw-type conveyor to be located above and rearwardly of said frame when in said one position.

* * * * *